United States Patent Office

2,848,586
Patented Aug. 19, 1958

2,848,586

NON-METALLIC ELECTRICAL HEATING ELEMENTS

Eugene Wainer, Cleveland Heights, and Donald E. Platt, Lakewood, Ohio, assignors to Thompson Products, Inc., Cleveland, Ohio, a corporation of Ohio No Drawing. Application September 9, 1953
Serial No. 379,313

10 Claims. (Cl. 201—63)

The present invention relates to new and improved non-metallic electrical heating elements, and the method of making same.

More particularly, it relates to a new and improved type of non-metallic or ceramic heating element capable of operating at temperatures in excess of 1500° C. in air with no adverse effects from oxidation.

Heretofore, heating elements, especially those employed in the smaller type of appliances, have been restricted to the use of one of three main classes of materials. These classes are platinum; nickel-chromium alloys with or without additives such as cobalt, aluminum, and zirconium; and silicon carbide.

Platinum, though operable in air at temperatures up to 1500° C. has the disadvantage of being extremely expensive. Another disadvantage in employing platinum in heating elements is that of mechanical weakness; that is, with extended use platinum tends to become brittle and extremely fragile to mechanical shock. Platinum also exhibits a particular sensitivity toward contamination such as reducing atmospheres, sulphur, carbon, and the like. It may thus be seen, that platinum is not particularly desirable nor practicable for use as a primary heating material in appliances.

Nickel-chromium alloys, on the other hand, are less expensive but have a maximum use temperature of only about 1100° C. When a nickel-chromium alloy is grossly modified by the addition of cobalt and/or aluminum, this temperature may sometimes be increased to about 1300° C. However, like platinum, nickel-chromium alloys are also extremely sensitive to contaminating substances at increased operating temperatures, and are rapidly destroyed if subjected to reducing atmospheres, particularly to those which contain sulphur or carbon. Alkalis are particularly harmful to nickel-chromium alloys.

Silicon carbide, which is produced in a rod form, has a maximum operating temperature in the range of from about 1500° to 1550° C. In this respect, silicon carbide is comparable to platinum. Because of its grain structure, however, an electrical element produced from silicon carbide is mechanically weak and displays relatively poor resistance to mechanical and thermal shocks. Accordingly, silicon carbide elements must be especially mounted to insure adequate life. Further, the fragile nature of silicon carbide requires that an element produced therefrom be brought to its operating temperature at a slow rate. The mechanical fragility of silicon carbide heating elements further limits their usefulness in that a fairly massive cross-section of the material must be utilized to insure proper strength. Because of these limitations silicon carbide heating elements have been generally restricted to use in heating enclosures such as furnaces.

We have found that it is now possible to prepare a non-metallic or ceramic electrical heating element from a mixture of a refractory metal silicide and an oxide or mixture of oxides selected from the second and third group of the periodic table. Heating elements produced in this manner are capable of being operated in air at temperatures in excess of 1500° C. for extended periods of time, without adverse effects from oxidation or from reducing atmospheres as was heretofore encountered.

We have also found that the effective life and oxidation resistance of such an element may be increased or enhanced by providing the element with a novel vitrified siliceous coating.

Further, by the present invention it is now possible to produce a heating element from a mixture of a refractory metal silicide and oxides of the second and third group elements of the periodic table in such a manner that an integral heating element is formed wherein the terminal or end portions have a lower electrical resistance than the intermediate portions and accordingly, said ends have a lower temperature during operation.

In accordance with the foregoing, an object of the invention is to provide a non-metallic or ceramic electrical heating element capable of operating in air at temperatures in excess of those available with heretofore known heating elements.

Another object of this invention is to provide a novel non-metallic electrical heating element capable of being molded into units of small cross-sectional area, thereby permitting the use of said element in standard heating appliances as well as in commercial furnaces, or the like.

A still further object is to provide a new form of non-metallic electrical heating elements having unique coating surfaces thereon so as to reduce oxidative destruction of said elements during operation in air at elevated temperatures.

Still another object of the present invention is to provide an integral non-metallic electrical heating element having end or terminal portions thereof of low electrical resistance and an intermediate portion of high electrical resistance.

A further object is to provide a method for producing a non-metallic heating element from a powdered refractory metal silicide, preferably molybdenum disilicide, and powdered oxides of the second and third group of elements of the periodic table, which heating element may or may not have a non-oxidative ceramic coating contained thereon, depending upon the conditions under which same is operated.

Other objects and advantages of the present invention will be apparent to those skilled in the art from the following disclosure.

The novel non-metallic or ceramic heating elements of the instant invention are produced from a mixture of a powdered refractory metal silicide and a powdered binder which comprises an oxide or a mixture of oxides of the second and third group of elements of the periodic table. This mixture of a powdered refractory metal silicide and the powdered binder is preferably formed into a rod-like shape by utilizing standard powdered metallurgy techniques such as by extruding the refractory metal silicide binder mixture when in a moist plastic condition, or by hydrostatic or pressure molding of the dried powder mixture in a die.

The rod-like electrical heating element may be produced as a solid rod comprising a uniform mixture of a refractory metal silicide and a binder and having a uniform electrical resistivity through its entire length. An alternative, and preferred method, as will be shown later, is to form the heating element rod in three separate pieces; namely, shorter, terminal portions having an electrical resistance lower than a longer, intermediate portion of a high electrical resistance. In this manner, it is possible to produce a heating element having a "hot" elongated center portion, and comparatively "cool" end portions.

Refractory metal silicides which may be used in the present invention comprise the silicides of molybdenum, tungsten, tantalum, zirconium, niobium, titanium and mixtures thereof. For obvious economic reasons molybdenum disilicide, zirconium silicide, niobium silicide and titanium silicide are the most practicable.

The refractory metal silicide is normally prepared by grinding in an iron ball mill in water to reduce to the proper particle size. After removal from the ball mill, any iron contamination in the refractory metal silicide is removed by leaching with an appropriate acid such as hydrochloric acid, or the like. In order to insure powder of the greatest possible resistance to oxidation, it is normally advantageous to employ a slight excess of silicon in the initial preparation of the refractory metal silicide. We have found that an excess of about 1% silicon insures sufficient oxidation protection.

The particle size of the powdered refractory metal silicide is not critical. A state of reduction corresponding to a —325 mesh or finer has been found quite adequate. It has also been found, however, that the finer the particle size of the powdered refractory metal silicide, the greater the strength of the heating element rod. If an extremely rigid and strong element rod is desired, it is often advantageous to reduce the particle size to a range of from about 1 to 6 microns.

After the powdered refractory metal silicide has been reduced to the desirable particle size it is admixed or incorporated with a powdered binder material. This binder material comprises powdered oxide or mixture of oxides selected from oxides of the second and third group elements of the periodic table. Examples of such powdered binder compounds are alumina, calcium aluminate, strontium aluminate, magnesium aluminate, magnesia, and the like. These powdered binder materials are preferably calcined and in the anhydrous state when admixed with the powdered refractory metal silicide.

The particle size of the binder material should be at least equivalent to the corresponding particle size of the refractory metal silicide. Preferably, however, a finer particle size is employed for the binder. For example, if the refractory metal silicide has an original particle size of —325 mesh or finer, the binding material should have a particle size in a range of from about —400 to —500 mesh or finer.

The ratio of powdered refractory metal silicide to the powdered oxide binder will vary, depending upon the electrical resistance desired in the rod. In general, the binder should be from 5 to 60% by weight of the rod while the silicide will generally be from 40 to 95% by weight of the rod. For instance, for a heating element capable of being operated on a 220 volt line with power-carrying facilities in the range of 15 to 50 amperes, we have found that a suitable resistance mixture is obtained from a composition consisting of from about 40 to 50% powdered refractory metal silicide and from about 60 to 50% of the powdered oxide binder. In other words, substantially equal portions of a powdered refractory metal silicide and a powdered oxide binder yield a heating element having an electrical resistance in the range of from about 1 to 15 ohms.

If a three-part rod element is desired, that is, having end portions of low resistance and an intermediate portion of high resistance, as described previously, it is advantageous to produce the end portions from mixtures comprising a major portion of a powdered refractory metal silicide and a minor portion of a powdered oxide binder. The low resistance ends may consist of the pure refractory metal silicide, if desired. For strength and compatibility purposes, however, it is preferred that the low resistance end portions contain a small percentage of the powdered oxide binder. We have found that desirable results and low electrical resistance may be obtained in these terminal portions when they are produced from mixtures containing from about 5 to 30% of a powdered oxide binder and from about 95 to 70% of a powdered refractory metal silicide.

For example, pure molybdenum disilicide has a resistivity of approximately 20 microhm-cms., whereas low resistance end portions produced from a mixture of 5–30% oxide binder and 95–70% molybdenum disilicide display an electrical resistivity which does not exceed approximately $10^{-4}$ ohm cm.

The heating element of the instant invention, whether it be a single, solid rod of uniform resistivity or a rod composed of three portions of different resistance, may be produced by such powdered metallurgical techniques as extrusion or pressure molding. If extrusion is employed it is preferable to place the mixture of the powdered refractory metal silicide and the powdered oxide binder in a plastic condition before extruding. This can be accomplished by admixing a minimum portion of water and an organic binding substance, such as methyl or ethyl cellulose, with the powdered mixture. After the plastic mass has been kneaded to the proper consistency the element rod may be extruded under pressure through a suitable orifice or die.

If the element is to be produced by pressure molding, such as by hydrostatic methods, the organic binder and the water are omitted. The element is formed by pressure molding the dry, mixed powders in a suitable die cavity suitable for producing the rod structure. Pressure molding is especially desirable where dimensional accuracy is required. As stated previously, the heating element of the instant invention is preferably formed into a rod-like shape having three integral portions; namely, "cool" end portions having low electrical resistance, and a larger, intermediate, "hot" portion having high electrical resistivity. This form of the element may be produced as follows:

The longer, intermediate portion of high electrical resistance, is extruded or pressure molded from a mixture comprising substantially equal portions of a powdered refractory metal silicide selected from a group comprising the silicides of molybdenum, tungsten, tantalum, zirconium, niobium and titanium or mixtures thereof, and a powdered oxide binder selected from an oxide or group of oxides of the second and third group elements of the periodic table.

The rod element which constitutes the low resistant terminal or end portions is produced in exactly the same manner as for the intermediate, high resistance portion, except that the mixture employed in producing the terminal portions comprises essentially a major portion of a powdered refractory metal silicide and a minor portion of a powdered oxide binder.

The joining of the low resistance terminal portions and high resistant intermediate portion is accomplished in the "green state." The "green" rods of the two compositions are accurately cut so that the ends thereof will match when brought together. Perfectly flat, right angle surfaces are effective for this purpose. However, improved results may be obtained if one surface, preferably the high resistant intermediate portion, has its ends slightly bowed or bulged and the opposing surfaces of the low resistant end portions have their end surfaces slightly concave to afford a complementary fitting relation. Before joining, the complimentary fitting surfaces are preferably cross-hatched with a suitable tool, such as a fine metal point.

The joining of the intermediate high resistance portion and the low resistance terminal portions is advantageously effected by cementing the parts together. The cement employed preferably consists of a thick slurry or paste formed by admixing a minimum portion of water with the powdered refractory metal silicide-powdered oxide binder mixture employed in forming the low resistance terminal portions. A thin film of this paste is applied over both ends of the intermediate section and the terminal portions are brought into contact therewith. A sufficient amount of pressure is applied to the terminal portions to insure a proper binding between the pieces, however, this pressure should not be great enough to deform the joint to any extent. The outside of the joint is then wiped with a wet slip of the paste and the entire rod structure is allowed to dry. When produced in this manner, a joint is obtained between the low resistance terminal portions and the high resistance intermediate portion which is as strong as the lowest strength portion of the entire rod element. In those cases where the low resistance end contain a substantial portion of the binding oxide, a fracture thereof takes place outside the joint in cross breaking the specimen.

After the rod element has dried, it may be fired in one of two general ways. The first, and preferred method for firing is by heating the element to a temperature from about 1350 to 1600° C. for several hours in an atmosphere of hydrogen. In the second method the element is fired by subjecting it to a temperature of about 1700° C. for several hours in an atmosphere of argon or hydrogen, or if desired in a vacuum. This firing employs a refractory metal silicide as the setter material. That is, the rods are preferably embedded to one third their diameter in a smooth bed of 100 mesh particles of the setter material during the firing operation.

It appears that the resistance to oxidation available in heating elements produced from mixtures of refractory metal silicides and oxide binders is due primarily to the formation of a tight vitreous coat of the silicate of the oxides used in the binding. For example, if alumina is used as the binder material the silicate is chiefly mullite of a crystalline nature, though non-porous. Such a non-porous mullite composition of crystalline nature is effective in preventing the intrusion of substantially all oxygen. Accordingly, uncoated rods produced by the present invention are capable of operating at extremely elevated temperatures for normal periods of time without the adverse effects of oxidation as were so prevalent with heating elements prepared heretofore.

If the heating rods or elements are to be employed at extremely high temperatures, such as up to about 1700° C., and for extended periods of time, we have found that it is desirable to coat the heating element rod with a siliceous vitrified, oxidation-resistant coating. This coating consists essentially of a glaze of silicon and/or other materials. This siliceous glaze preferably comprises at least 90% silica fluxed with a minor amount of such compounds as alumina, calcium oxide, boric oxide, titania, or combinations thereof. In some instances, a wash coat of calcium oxide alone may also be employed as the glaze, but the glaze should be vitreous.

The glaze composition which may be used when the element is to be subjected to temperatures on a continual basis in excess of 1500° C. for extended periods in air is based on a requirement that the glaze shall contain at least 90% silica in finished form. Two general techniques have been found to be effective in forming this glaze on the element.

In the first method, after the element has been formed and fired, a finely powdered glaze is applied to the surface of the element by dipping or spraying. The element is then heated in air to the point of vitrification of the glaze. In this method, the glaze will preferably consist of from about 90 to 97% finely divided silicon oxide and the balance consisting of a fluxing compound comprising one or more of the oxides taken from the group consisting of alumina, boric oxide, titania, calcium oxide or mixtures thereof. A preferred composition for this method is about 95 parts of silicon oxide, 3 parts of alumina, and 2 parts of boric oxide. Another preferred composition consists of about 95 parts of silicon oxide, 4 parts of alumina, and 1 part of calcium oxide.

The second method for preparing the glaze is preferred in that it simplifies the application of the glaze and effects a tighter bonding thereof to the element body. In this method, the initial glaze is based upon finely divided elemental silicon which may or may not contain fluxing additives in the form of oxides as listed for the first glaze formulation. The starting raw material is composed preferably of 90 to 95% elemental silicon in a finely divided form which is preferably mixed with smaller quantities of fluxing compounds comprising one or more oxides taken from the group consisting of boric oxide, titania oxide calcium oxide and mixtures thereof. If calcium oxide is employed, it is desirable to supply same in the form of its aluminate.

After the heating element rod has been formed and thoroughly dried, but before it has been fired, the glaze mixture based on elemental silicon is applied as a thin film over the entire surface. This may be effected by dipping or spraying. The rod containing the glaze thereon is then suitably fired, as mentioned previously, to set the refractory metal silicide and oxide binder constituents of the rod. The elemental silicon of the glaze is then conveniently transformed completely to silicon dioxide upon the first oxidative firing of the element by electricity. That is, the first time the element is used as a resistor type heating element the extreme temperatures created thereby convert the elemental silicon to silicon dioxide yielding a very tight vitreous film. As indicated, this technique has the advantages of eliminating one step in the preparation over that when the glazed constituents are applied in the fully oxidized forms.

The following example specifically employing molybdenum disilicide as the refractory metal silicide is given by way of illustration only, and is not intended to limit our invention solely to this compound:

43 parts by weight of a −325 mesh molybdenum disilicide were mixed with 57 parts by weight of −500 mesh calcined aluminum oxide.

To this mixture was added 2 parts by weight of methyl cellulose and the composition was thoroughly blended by passage through a micro-pulverizer. 12 parts by weight of water were kneaded in and the kneading continued until a completely plastic mass was obtained. The piece was then formed into a rod shape by extrusion through a die under suitable pressure. The rod element thus formed was placed in a plaster bath and allowed to air dry for about one hour.

A composition similar to the foregoing was also prepared and extruded through the same die except that the composition consisted of 80 parts of −325 mesh molybdenum disilicide by weight, 20 parts of −500 mesh calcined aluminum oxide, and two parts of methyl cellulose.

After the rods of both compositions had dried approximately for one hour, the ends of the rods were cut cleanly at right angles to their length with a razor blade. In order to form a rod having an overall length of six inches, the high alumina containing high resistance intermediate portion rod was cut to a length of roughly 4½ inches. The low percentage alumina low resistance terminal portions rod was cut into two pieces, roughly ¾ of an inch each in length. The opposing ends of the rods were cross-hatched with a needle forming cross-hatchings to a depth of about 1/16 of an inch and approximately 1/16 of an inch apart. A cement was made up by taking a portion of the low percentage alumina composition employed in extruding the rod for the low resistance terminal portions and was admixed with a minimum amount of water sufficient to produce a thick paste. This paste was painted on the cross-hatched surfaces and the ends were immediately brought together with a sufficient amount of minimum pressure. The pressure was sufficient to insure complete contact but not to deform the pieces. After holding the pieces under pressure for a few minutes, the joint between the pieces was then painted thoroughly with further portions of the paste and the assemblage was allowed to thoroughly air-dry for four hours. This air drying was followed by oven-drying at 100° C.

The fully dried piece was then coated with a glaze composition consisting of 92 parts elemental silicon 2 parts boric oxide, and 6 parts alumina. This glaze was prepared by grinding the mixture in methyl alcohol in an iron ball mill to a particle size of about 20 microns. The glaze mixture was then applied as a thin film to the surface of the rod element by brushing. After the coating had dried, the piece was fired.

This firing was effected by placing the glazed "green rod" on a smooth bed of 100 mesh molybdenum disilicide particles, embedding the rod to about ⅓ of its diameter. The piece was then fired at 1550° C. for ten hours in an atmosphere of hydrogen.

In order to insure that the glaze coat had been properly bonded to the element, the coated rod was subjected to a further heating treatment. This further heating treatment consisted of applying metal electrodes to the low resistance terminal portions of the rod after the piece has cooled to room temperature. These metal electrodes consisted of aluminum which was sprayed on the terminal portions of the rod. Metal clamps were then attached to the terminal portions and the clamps attached to a source of power. In the course of three hours, the temperature was raised by the application of electricity to a range of between 1500 and 1600° C. This second heating step formed a fully oxidized, completely vitreous coating of a siliceous glass containing approximately 95% silicon dioxide on the outer surface of the heating element.

Rod-like heating elements produced by these methods also have the advantage that the conductivity and resistivity of the low resistant terminal portions do not change during use. Since the oxidation and vitrification temperatures (1200 to 1600° C.) of the low resistance terminal portions is never attained during operation the conductivity of the terminal portions remains high. Accordingly, as opposed to silicon carbide elements, heating elements produced by the instant invention do not require larger amounts of current to effect proper heating as the element increases with age or use.

A rod-like heating element produced by the method of the present invention gives ideal resistance properties. For example, a resistor of the present invention roughly six inches in length and 0.25 inch in diameter will have a resistance in the range of from about 5 to 10 ohms and such resistor can be operated adequately on the normal 220 volt line sources without the use of intervening transformers. This was not possible with ceramic heating elements produced heretofore.

It will be appreciated by those skilled in the art that variations and modifications may be made without departing from the novel scope of the present invention.

We claim as our invention:

1. An electrical heating element having a central high-resistance portion and terminal low-resistance portions integral with said high-resistance portion, said portions being composed of a binder selected from the group consisting of oxides of the second and third group elements of the periodic table and refractory metal silicides selected from the group consisting of the silicides of molybdenum, tungsten, tantalum, zirconium, niobium, titanium and mixtures thereof, said central portion comprising substantially equal portions by weight of the refractory metal silicide and said binder and said terminal portions comprising a major portion of said refractory metal silicide and a minor portion of said binder.

2. An electrical heating element capable of operating in air at temperatures in excess of 1500° C. without adverse effects from oxidation, which comprises a rod consisting essentially of substantially equal portions by weight of particles selected from the group of silicides of molybdenum, tungsten, tantalum, zirconium, niobium, titanium and mixtures thereof, bound together by a binder selected from oxides of the second and third group elements of the periodic table, and a glaze coating on said rod composed essentially of silica.

3. An electrical heating element capable of operating in air at temperatures in excess of 1500° C. without adverse effects from oxidation, which comprises a rod having terminal portions of low electrical resistance integral with an intermediate portion of high electrical resistance, said intermediate portion comprising substantially equal portions by weight of a refractory metal silicide selected from the group consisting of the silicides of molybdenum, tungsten, tantalum, zirconium, niobium, titanium and mixtures thereof and a binder, said binder being selected from the group consisting of alumina, calcium aluminate, strontium aluminate, magnesium aluminate, magnesia, and mixtures thereof, and said terminal portions comprising a major portion by weight of said refractory metal silicide and a minor portion by weight of said binder, and said electrical heating element having a continuous, vitrified, oxidation-resistant coating thereon which comprises a major portion of silicon fluxed with a minor portion of a compound selected from the group consisting of alumina, calcium oxide, boric oxide, titania and mixtures thereof.

4. An electrical heating element capable of operating in air at temperatures in excess of 1500° C. without adverse effects from oxidation which comprises a mixture consisting essentially of substantially equal portions by weight of a refractory metal silicide and a binder selected from the group consisting of oxides of the elements of the second and third group of the periodic table, said electrical heating element having a continuous, vitrified, oxidation-resistant coating thereon which comprises a major portion of silica fluxed with a minor portion of a mixture of alumina, and boric oxide.

5. An electrical heating element capable of operating in air at temperatures in excess of 1500° C. without adverse effects from oxidation, which comprises a mixture consisting essentially of substantially equal portions by weight of a refractory metal silicide selected from the group consisting of the silicides of molybdenum, tungsten, tantalum, zirconium, niobium, titanium and mixtures thereof and a binder, said binder being selected from the group consisting of alumina, calcium aluminate, strontium aluminate, magnesium aluminate, magnesia and mixtures thereof, and said electrical heating element having a continuous, vitrified, oxidation-resistant coating thereon which comprises a major portion of silicon fluxed with a minor portion of a compound selected from the group consisting of alumina, calcium oxide, boric oxide, titania and mixtures thereof.

6. A method for producing an electrical heating element capable of operating in air at temperatures in excess of 1500° C. without adverse effects from oxidation, which comprises forming a moist plastic mass consisting essentially of substantially equal portions by weight of a refractory metal silicide selected from the group consisting of the silicides of molybdenum, tungsten, tantalum, zirconium, niobium, titanium and mixtures thereof and a binder, said binder being selected from the group consisting of alumina, calcium aluminate, strontium aluminate, magnesium aluminate, magnesia and mixtures thereof, extruding said plastic mass into a rod, drying said rod, providing said rod with a continuous, vitrified, oxidation-resistant coating thereon which comprises a major portion of silicon fluxed with a minor portion of a compound selected from the group consisting of alumina, calcium oxide, boric oxide, titania and mixtures thereof, and firing said coated rod in a non-oxiding atmosphere at elevated temperatures to set the constituents thereof and to firmly bond the coating on said rod thereto, thereby converting the silicon present in said siliceous coating to silicon dioxide which provides a tight, oxidation-resistant, vitreous film on said rod.

7. A method for producing an electrical heating element capable of operating in air at temperatures in excess of 1500° C. without adverse effects from oxidation, which comprises forming a first rod of high electrical resistance from a mixture consisting essentially of substantially equal portions by weight of a refractory metal silicide selected from the group consisting of the silicides of molybdenum, tungsten, tantalum, zirconium, niobium, titanium and mixtures thereof, and a binder, said binder being selected from the group consisting of alumina, calcium aluminate, strontium aluminate, magnesium aluminate, magnesia and mixtures thereof, forming a pair of second, shorter rods of a low electrical resistance from a mixture consisting essentially of a major portion by weight of said refractory metal silicide and a minor portion by weight said binder, affixing said second, shorter rods integrally to the ends of said first rod by means of a cement which comprises a slurry of the mixture employed in producing said second, shorter rods, firing said element at elevated temperatures in a non-oxidizing atmosphere to set said rod, coating said element with a siliceous coating which comprises a major portion of silicon fluxed with a minor portion of a compound selected from the group consisting of alumina, calcium oxide, boric oxide, titania and mixtures thereof, and heating said coated element to vitrify said siliceous coating and to tightly bond the same to said element.

8. An electrical heating element consisting essentially of a coherent self-sustaining compressed shape of a mixture of substantially equal portions of refractory metal silicide particles said metal being selected from the group consisting of molybdenum, tungsten, tantalum, zirconium, niobium, titanium, and mixtures thereof and an oxide of a metal selected from the metals of the second and third groups of the periodic table.

9. An electrical heating element consisting essentially of a coherent self-sustaining compressed shape of a mixture of from about 40 to about 95% by weight of particles of a refractory metal silicide of a metal selected from the group consisting of molybdenum, tungsten, tantalum, zirconium, niobium, titanium, and mixtures thereof in combination with from about 5 to about 60% by weight of a binder consisting of an oxide of a metal selected from the group consisting of the metals of the second and third groups of the periodic table.

10. An electrical heating element consisting essentially of a coherent, self-sustaining compressed shape of a mixture of substantially equal parts by weight of particles of a refractory metal silicide said metal being selected from the group consisting of molybdenum, tungsten, tantalum, zirconium, niobium, titanium, and mixtures thereof and particles of an alumina binder.

References Cited in the file of this patent

UNITED STATES PATENTS

| | | |
|---|---|---|
| 2,003,592 | Hediger | June 4, 1935 |
| 2,138,870 | Lower | Dec. 6, 1938 |
| 2,457,678 | Jira | Dec. 28, 1948 |
| 2,619,406 | Briney | Nov. 25, 1952 |
| 2,622,304 | Coffer | Dec. 23, 1952 |
| 2,745,928 | Glaser | May 15, 1956 |

OTHER REFERENCES

Metall (1952), article by Kieffer, page 249, col. 1 is pertinent.